United States Patent Office 3,506,596
Patented Apr. 14, 1970

3,506,596
SEMICONDUCTING CERAMIC COMPOSITIONS WITH POSITIVE TEMPERATURE COEFFICIENT OF RESISTANCE
Yoshihiro Matsuo, Masanori Fujimura, Hiromu Sasaki, and Shigeru Hayakawa, Osaka, Japan, assignors to Matsushita Electric Industrial Co., Ltd., Osaka, Japan
Filed Oct. 11, 1967, Ser. No. 674,455
Int. Cl. C04b 33/00; H01b 1/06
U.S. Cl. 252—520
12 Claims

ABSTRACT OF THE DISCLOSURE

Semiconducting ceramic compositions with positive temperature coefficient of electrical resistance (PTC) over certain temperature ranges comprise essentially 0.99 to 1.05 mole(s) of titanium dioxide, titanium stannum oxide or titanium zirconium oxide and 0.007 to 0.27 mole of boron oxide-germanium dioxide or boron oxide-silicon dioxide or aluminum oxide-germanium oxide per mole of barum oxide or barium strontium oxide or barium lead oxide. The boron oxide can be replaced by $Al_2O_3$, the $GeO_2$ by $SiO_2$ in specified amounts.

---

This invention relates to ceramic compositions having a positive temperature coefficient of electrical resistance (PTC) over limited temperature ranges.

It has been well known that barium titanate is characterized by a relatively low electrical resistance at room temperature and an abrupt rise in such resistance over a limited temperature range from a relatively constant resistance to an extremely high resistance when a small amount of rare earth element oxide such as lanthanum oxide, cerium oxide, yttrium oxide or gadolinium oxide is incorporated into the barium titanate. Such a semiconducting barium titanate, however, has drawbacks in that its electrical properties are strongly affected by a slight change in the principal composition, the concentration and distribution of additive rare earth element oxides and undesirable impurities. In addition to these drawbacks, prior materials have required strictly controlled preparation procedures, such as firing atmosphere, soaking time at the firing temperature, and cooling rate. A minor change in the composition and preparation procedures results in a wide variation in the resultant electrical properties such as room temperature resistance and PTC. Therefore, it is difficult to obtain a high production yield when employing the prior barium titanate having rare earth element oxide incorporated therewith.

The PTC of conventional PTC ceramic material comprising $BaTiO_3$ admixed with said rare earth element oxide loses or suffers impairment of the PTC property when subjected to an application of a high voltage, depending on the size of the body. Such phenomenon is called thermal breakdown and prevents the PTC ceramic material from being used as an electric heater to be supplied with a high voltage.

The application of PTC material to electronic devices also requires electrical properties which are extremely stable to humidity, time, temperature and applied voltage. It is necessary for such stability that fired bodies exhibit a high density and a uniform grain size.

It is an object of the invention to provide semiconducting PTC ceramic compositions which are not affected in their electrical properties by the impurities contained in expensive industry-grade raw materials.

It is another object of the invention to provide semiconducting PTC ceramic compositions characterized by little variation in electrical properties which change in principal compositions.

It is another object of the invention to provide semiconducting PTC ceramic compositions which need no strictly controlled preparation process for making fired bodies.

It is a further object of the invention to provide semiconducting PTC compositions characterided by strong resistance to thermal breakdown, and by stability in usage under a high power.

These and other objects of this invention will become apparent upon consideration of the following description taken together with accompanying drawings in which.

Figure 1:
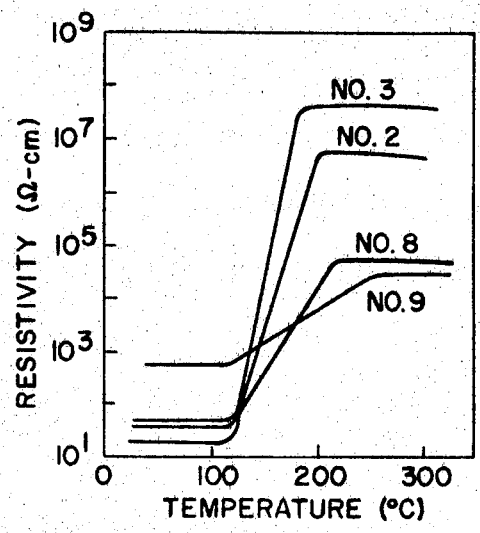
FIG. 1 is a graph illustrating the relation between temperature and electrical resistance of the semiconducting PTC material according to the invention.

According to the invention, an electrical resistivity of 10 to $10^4$ ohm-cm. and a positive temperature coefficient of electrical resistance can be obtained with a $BaTiO_3$ ceramic body having incorporated therewith a combined addition of $B_2O_3$-$GeO_2$, $B_2O_3$-$SiO_2$ or $Al_2O_3$-$GeO_2$. The ceramic body according to the invention shows a low electrical resistivity even when composed of impure industry-grade raw materials and even when air-fired at a temperature of 1260° to 1380° C. for one to ten hours.

The combined addition of less than 0.002 mole of $B_2O_3$ and less than 0.005 mole of $GeO_2$ to one mole of $BaTiO_3$ does not show semiconduction and PTC effect. On the other hand, the combined addition of more than 0.07 mole of $B_2O_3$ and more than 0.20 mole of $GeO_2$ to one mole of $BaTiO_3$ shows its semiconduction but only little PTC effect. Operable compositions for said semiconducting PTC material are listed on Table 1.

TABLE 1

Operable compositions for PTC material

Composition I: | Mole
--- | ---
BaO | 1.00
$TiO_2$ | 0.99–1.05
$B_2O_3$ | 0.002–0.07
$GeO_2$ | 0.005–0.20

Composition II: | 
--- | ---
BaO | 1.00
$TiO_2$ | 0.99–1.05
$B_2O_3$ | 0.002–0.07
$SiO_2$ | 0.005–0.20

Composition III: | 
--- | ---
BaO | 1.00
$TiO_2$ | 0.99–1.05
$Al_2O_3$ | 0.002–0.07
$GeO_2$ | 0.005–0.20

In particular, the specified combined addition having a 1:3 mole ratio of $B_2O_3$ to $GeO_2$ gives a minimum variation in the electrical resistivity levels of the resultant fired body.

The resistivity level is constant (20–50 Ω-cm.) in the concentration range of 0.01 to 0.20 mole of the combined addition in a mole ratio of ⅓ $B_2O_3$ to $GeO_2$. The PTC of the resultant material is dependent on the concentration of the combined addition in a mole ratio of ⅓ $B_2O_3$ to $GeO_2$. The PTC increases with an increase in the concentration to a maximum value at the combined addition of 0.0167 mole of $B_2O_3$ and 0.05 mole of $GeO_2$, and decreases with a further increase in the concentrations. Therefore, $BaTiO_3$ ceramic incorporated with the combined addition of 0.0167 mole of $B_2O_3$ and 0.05 mole of $GeO_2$ is more desirable for application to a thermal switch utilizing a steep increase in the resistance over controlled temperature ranges.

It is a great feature of the compositions according to the invention that the compositions can produce a semi-conducting PTC material having a low electrical resistivity of 10 to $10^4$ ohm-cm. and a positive temperature coefficient of resistivity even when the mole ratio of BaO to $TiO_2$ deviates from 1:1 as shown in Table 1. Conventional barium titanate compositions comprising a rare earth element oxide readily fail to provide the reproducibility of resistivity levels of semiconducting PTC materials when the principal compositions deviate slightly from the stoichiometric composition. According to the present invention, semiconducting PTC barium titanate can be obtained with the principal compositions of 1.00 mole of barium oxide and 0.99 to 1.05 mole(s) of titanium dioxide where the principal compositions are incorporated with the aforesaid amounts of combined additions.

It is known that barium titanate doped with rare earth element oxide posseses electrical properties which vary sensitively with soaking time at firing temperature and with the cooling rate when it is fired and cooled in air. The novel compositions, however, can produce very stable electrical properties, invariant with the soaking time ranging from one to ten hours at the firing temperature of 1300° C. and with a cooling rate ranging from 30° C. per hour to 900° C. per hour, even when they are fired in air. The resistivity levels and bulk density of the fired body are also independent at a firing temperature of 1260° C. to 1380° C. The PTC semi-conducting material which comprises 1.00 mole of $BaTiO_3$, 0.0167 mole of $B_2O_3$ and 0.05 mole of $GeO_2$ and is heated at the temperature of 1260° to 1380° C. has resistivities of 20 to 50Ω-cm. bulk densities of 5.6 to 5.8 g./cm.$^3$, and water adsorption of less than 0.01%. Therefore, a high yield can be easily obtained with the novel compositions fired in air in accordance with this invention.

It will be clear from Table 3 that the novel compositions according to the invention produce the semiconducting PTC material resistivity even when impure industry-grade raw materials of $TiO_2$ and $BaCO_3$ are used as starting materials as indicated in Table 2. In contrast to the novel compositions, the conventional $BaTiO_3$ compositions comprising rare earth element oxide such as $La_2O_3$, $Ce_2O_3$ and $Bi_2O_3$ as an additive do not produce a semiconducting PTC material having a low electric resistivity.

TABLE 2

Impurities of raw materials (wt. percent)

Titanium dioxide—$TiO_2$, 98:

| | |
|---|---|
| Si | 1~0.1 |
| Zr | 0.1~0.01 |
| P | 0.1~0.01 |
| Fe | 0.01~0.001 |
| Mg | 0.01~0.001 |
| Ca | 0.01~0.001 |
| Pb | 0.01~0.001 |
| Sn | 0.01~0.001 |
| Zn | 0.01~0.001 |
| Ag | <0.0005 |
| Sr | <0.0005 |
| Ba | <0.005 |

Barium carbonate—$BaCO_3$, 98:

| | |
|---|---|
| Ca | 1~0.1 |
| Mg | 0.1~0.01 |
| Sn | 0.1~0.01 |
| Fe | 0.01~0.001 |
| Mn | 0.01~0.001 |
| Pb | 0.01~0.001 |
| Sr | 0.01~0.001 |
| Cr | <0.0005 |

TABLE 3

Effect of additives on the resistivity of $BaTiO_3$
(Industrial-grade chemicals)

| Additives and amounts added to one mole of $BaTiO_3$— | Resistivity (Ω-cm.) |
|---|---|
| Non additives | >10 |
| New combined additives: | |
| 0.0067 mole of $B_2O_3$ and 0.05 mole of $GeO_2$ | $7 \times 10^2$ |
| 0.0167 mole of $B_2O_3$ and 0.05 mole of $GeO_2$ | $2 \times 10$ |
| Conventional additives: | |
| 0.002 mole of $LaTiO_3$ | >10 |
| 0.004 mole of $LaTiO_3$ | >10 |
| 0.003 mole of $CeTiO_3$ | >10 |
| 0.003 mole of $BaTiO_3$ | >10 |

The microscopic observations indicate that the fired body comprising the combined addition of 0.003 to 0.067 mole of $B_2O_3$ and 0.01 to 0.2 mole of $GeO_2$ shows uniform grain sizes 3 to 50 microns and round grain shape. It is the characteristic of microstructures of the fired body comprising a novel composition of the invention that each grain is separated by an intergranular region consisting of a different phase from that within the grain. Electron microprobe analyses of the fired body indicate that this intergranular region consists mainly of the elements Ge, B and Ti.

According to the present invention, the partial substitution of $SiO_2$ for $GeO_2$ or the partial substitution of $Al_2O_3$ for $B_2O_3$ in the combined addition of Table 1 improves the resistance to thermal breakdown of the resultant semiconducting PTC material. Operable substitution is as follows with reference to Table 1:

(1) 0.002 to 0.07 mole of $B_2O_3$ in composition I is replaced by 0.001 to 0.056 mole of $Al_2O_3$;

(2) 0.005 to 0.20 mole of $GeO_2$ in composition I is replaced by 0.001 to 0.16 mole of $SiO_2$;

(3) 0.002 to 0.07 mole of $B_2O_3$ in composition II is replaced by 0.001 to 0.056 mole of $Al_2O_3$;

(4) 0.005 to 0.20 mole of $GeO_2$ in composition III is replaced by 0.001 to 0.16 mole of $SiO_2$.

Some applications require the semiconducting PTC ceramic body to vary with respect to the temperature at which the resistivity begins to increase. The temperature corresponds to the Curie temperature of $BaTiO_3$ and can be shifted widely by employing barium strontium oxide, barium lead oxide, titanium stannum dioxide, or titanium zirconium dioxide without any deterioration of the desirable electrical properties in accordance with this invention. Said barium strontium oxide, barium lead oxide, titanium stannum dioxide, and titanium zirconium dioxide are a mixture of the two oxides ad are defined by chemical formulas: $(1-x)BaO \cdot xSrO$, $(1-x)BaO \cdot xPbO$, $(1-y)TiO_2 \cdot ySnO_2$, and $(1-y)TiO_2 \cdot yZrO_2$, respectively, wherein $x$ ranges from 0.001 to 0.45 and $y$ ranges from 0.001 to 0.30.

Employing the $(1-x)BaO \cdot xPbO$ wherein $x$ ranges from 0.001 to 0.45 can elevate the resistance-rise up-temperature to 300° C. from 120° C. The resistance-rise up-temperature can be lowered from 120° C. to −10° C. by employing the $(1-x)BaO \cdot xSrO$ wherein the operable amount of $x$ is from 0.001 to 0.45. Employing the $(1-y)TiO_2 \cdot ySnO_2$ wherein $y$ ranges from 0.001 to 0.30 can lower the resistance-rise up-temperature from 120° C. to −120° C. The resistance-rise up-temperature also can be lowered from 120° C. to −30° C. by employing the $(1-y)TiO_2 \cdot yZrO_2$ wherein $y$ ranges from 0.001 to 0.30.

The semiconducting PTC materials of the present invention, which is characterized by stability in usage under the high power of some hundred wattage, can be applied to many devices, such as thermoregulators, over-current protectors, heating elements with self regulating action of current, voltage stabilizers, temperature compensators, etc.

In preparing the semiconducting materials of the present invention, all industrial-grade raw materials can be used. The titanium dioxide in an anatase form can be employed. The strontium carbonate and lead oxide (yellow form) can be added to titanium dioxide. Commercially available boron oxide, aluminum oxide, germanium dioxide and $T_2$ is the temperature at which the electrical resistance just ceases to increase,
$R_1$ is the electrical resistance at $T_1$, and
$R_2$ is the electrical resistance at $T_2$.

Abrupt rise in electrical resistivity is readily controlled by changing the amount of the combined addition according to the invention.

TABLE 4

| No. | Principal Composition (mole) | | Additives (mole) | | | | Firing Temperature (° C.) | Resistivity at room temperature (Ω-cm.) | PTC (percent) |
|---|---|---|---|---|---|---|---|---|---|
| | BaO | $TiO_2$ | $B_2O_3$ | $GeO_2$ | $Al_2O_3$ | $SiO_2$ | | | |
| 1 | 1.00 | 1.00 | 0.003 | 0.009 | | | 1,320 | 200 | 6 |
| 2 | 1.00 | 1.00 | 0.01 | 0.03 | | | 1,320 | 37 | 15 |
| 3 | 1.00 | 1.00 | 0.0167 | 0.05 | | | 1,300 | 25 | 21 |
| 4 | 1.00 | 0.99 | 0.0167 | 0.05 | | | 1,300 | 40 | 20 |
| 5 | 1.00 | 1.02 | 0.0167 | 0.05 | | | 3,000 | 25 | 20 |
| 6 | 1.00 | 1.05 | 0.0167 | 0.05 | | | 1,300 | 25 | 19 |
| 7 | 1.00 | 1.00 | 0.03 | 0.09 | | | 1,300 | 20 | 13 |
| 8 | 1.00 | 1.00 | 0.04 | 0.12 | | | 1,280 | 50 | 7 |
| 9 | 1.00 | 1.00 | 0.05 | 0.20 | | | 1,260 | 580 | 3 |
| 10 | 1.00 | 1.0125 | 0.0167 | 0.0375 | | | 1,300 | 25 | 20 |
| 11 | 1.00 | 1.0125 | | 0.0375 | 0.0167 | | 1,300 | 30 | 21 |
| 12 | 1.00 | 1.00 | 0.0167 | 0.0375 | | 0.0125 | 1,300 | 25 | 22 |
| 13 | 1.00 | 0.99 | 0.01 | 0.10 | | | 1,280 | 80 | 9 |
| 14 | 1.00 | 1.01 | 0.05 | 0.01 | | | 1,320 | 160 | 8 | silicon dioxide can be used. Desired compositions comprising titanium dioxide, barium oxide, boron oxide and germanium dioxide, for example, are wet mixed in a rubber lined pot mill using agate balls. A ball milling time of 24 to 48 hours gives an intimate homogeneous mixture. The resultant mixture is dried, for example, by heating at 200° C. 100 grams of the resultant powder is admixed with 8 cc. of a 5 percent aqueous emulsion of polyvinyl alcohol. The organic binder is used to enable the powder to be compacted, in a pellet forming machine, into pellets of desired size and shape. Good results have been obtained when pressures of from 750 to 1000 kg./cm.$^2$ are applied to the powder. The pressed bodies are then sintered in air at a densifying temperature. Firing temperatures of 1260° C. to 1380° C. are sufficient. Firing time of an hour to ten hours is adequate, usually two hours suffice. These materials are then provided with electrodes of an ohmic contact at spaced portions thereof in order to determine the above-mentioned semiconducting characteristics. The electrodes can satisfactorily be of an electroless nickel plating or of applied indium gallium (1:1) alloy. Electrical resistance can be measured in a conventional method by using a Wheatstone bridge.

Following examples illustrate specific novel compositions of this invention, but are not intended to be construed as limitative.

Example 1

The compositions listed in Table 4 are mixed, pressed and air-fired at temperatures of 1260 to 1320° C. for 2 hours in a similar way to that described in the preceding portion of this specification. The positive temperature coefficient of electrical resistivity is graphically illustrated in FIG. 1. The PTC is calculated from the following equation:

$$PTC = 2.303 \, (\log_{10} R_2/R_1)(T_2 - T_1)$$

where $T_1$ is the temperature at which the electrical resistance begins to increase, Example 2

Figure 2:
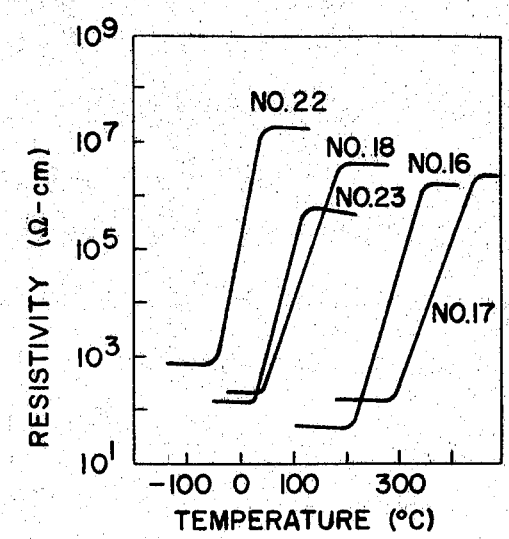
FIG. 2 is a graph illustrating effects of partial replacement of principal ingredients, on the electrical properties.

The compositions listed in Table 5 are mixed, pressed and air-fired at temperatures of 1260 to 1340° C. for 2 hours in a similar way to that described in the preceding portion of the specification. The positive temperature coefficient of electrical resistivity is illustrated graphically in FIG. 2. A temperature characterized by an abrupt rise in resistivity is readily changed by employing barium strontium oxide, barium lead oxide, titanium stannum dioxide, or the titanium zirconium dioxide in accordance with the present invention.

TABLE 5

| No. | Principal Composition | Additives (mole) | | | | Firing Temperature (° C.) | Restivity at room (Ω-cm.) | Resistance-rise up-Temperature (° C.) |
|---|---|---|---|---|---|---|---|---|
| | | $B_2O_3$ | $GeO_2$ | $Al_2O_3$ | $SiO_2$ | | | |
| 15 | $Ba_{0.95}Pb_{0.05}TiO_3$ | 0.0167 | 0.05 | | | 1,300 | 38 | 150 |
| 16 | $Ba_{0.80}Pb_{0.20}TiO_3$ | 0.0167 | 0.05 | | | 1,280 | 52 | 215 |
| 17 | $Ba_{0.60}Pb_{0.40}TiO_3$ | 0.0167 | 0.0375 | | 0.0125 | 1,260 | 180 | 290 |
| 18 | $Ba_{0.70}Pb_{0.30}TiO_3$ | 0.0167 | 0.05 | | | 1,320 | 210 | 40 |
| 19 | $BaTi_{0.95}Sn_{0.05}O_3$ | 0.0167 | 0.05 | | | 1,300 | 23 | 80 |
| 20 | $BaTi_{0.90}Sn_{0.10}O_3$ | 0.0084 | 0.05 | 0.0083 | | 1,280 | 22 | 40 |
| 21 | $BaTi_{0.85}Sn_{0.15}O_3$ | | 0.05 | 0.0167 | | 1,280 | 6×10$^3$ | 0 |
| 22 | $BaTi_{0.80}Sn_{0.20}O_3$ | 0.0167 | 0.0375 | | 0.0125 | 1,280 | 3×10$^6$ | −50 |
| 23 | $BaTi_{0.80}Zr_{0.20}O_3$ | 0.0167 | 0.05 | | | 1,340 | 135 | 30 |

Having thus disclosed the invention, what is claimed is:

1. A ceramic composition for semiconducting materials with a positive temperature coefficient of electrical resistance, comprising essentially of (A) 1.00 mole of an oxide selected from the group consisting of barium oxide, barium strontium oxide, and barium lead oxide, and (B) 0.99 to 1.05 mole(s) of an oxide selected from the group consisting of titanium dioxide, titanium stannum dioxide, and titanium zirconium dioxide, and (C) 0.007 to 0.27 mole of a combined addition selected from the group consisting of a combination of boron oxide and germanium dioxide, a combination of boron oxide and silicon dioxide, and a combination of aluminum oxide and germanium dioxide.

2. A ceramic composition according to claim 1, wherein said combined addition consists essentially of 0.002 to 0.07 mole of $B_2O_3$ and 0.005 to 0.20 mole of $GeO_2$.

3. A ceramic composition according to claim 1, wherein said combined addition consists essentially of 0.002 to 0.07 mole of $B_2O_3$ and 0.005 to 0.20 mole of $SiO_2$.

4. A ceramic composition according to claim 1, wherein said combined addition consists essentially of 0.002 to 0.07 mole of $Al_2O_3$ and 0.005 to 0.20 mole of $GeO_2$.

5. A ceramic composition according to claim 2, wherein said 0.002 to 0.07 mole of $B_2O_3$ is partially replaced with 0.001 to 0.056 mole of $Al_2O_3$.

6. A ceramic composition according to claim 2, wherein said 0.005 to 0.20 mole of $GeO_2$ is partially replaced with 0.001 to 0.16 mole of $SiO_2$.

7. A ceramic composition according to claim 3, wherein said 0.002 to 0.07 mole of $B_2O_3$ is partially replaced with 0.001 to 0.056 mole of $Al_2O_3$.

8. A ceramic composition according to claim 4, wherein said 0.005 to 0.20 mole of $GeO_2$ is partially replaced with 0.001 to 0.16 mole of $SiO_2$.

9. A ceramic composition according to claim 1, wherein said barium strontium oxide is $(1-x)BaO \cdot SrO$ wherein $x$ ranges from 0.001 to 0.45.

10. A ceramic composition according to claim 1, wherein said barium lead oxide is $(1-x)BaO \cdot xPbO$ wherein $x$ ranges from 0.001 to 0.45.

11. A ceramic composition according to claim 1, wherein said titanium stannum oxide is $(1-y)TiO_2 \cdot ySnO_2$ wherein $y$ ranges from 0.001 to 0.30.

12. A ceramic composition according to claim 1, wherein said titanium zirconium oxide is $(1-y)TiO_2 \cdot yZrO_2$ wherein $y$ ranges from 0.001 to 0.30.

References Cited

UNITED STATES PATENTS

| 2,829,979 | 4/1958 | Calis | 252—63.5 |
| 3,373,120 | 3/1968 | Nitta et al. | 252—520 |

FOREIGN PATENTS 583,494    12/1946    Great Britain.

DOUGLAS J. DRUMMOND, Primary Examiner

U.S. Cl. X.R.

106—39